United States Patent
Francis, Jr. et al.

(10) Patent No.: US 9,399,290 B2
(45) Date of Patent: *Jul. 26, 2016

(54) ENHANCING SENSOR DATA BY COORDINATING AND/OR CORRELATING DATA ATTRIBUTES

(71) Applicant: Google Inc., Mountain View, CA (US)

(72) Inventors: Anthony G. Francis, Jr., San Jose, CA (US); Ryan Hickman, Mountain View, CA (US); Arshan Poursohi, Berkeley, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,676

(22) Filed: Sep. 23, 2014

(65) Prior Publication Data

US 2015/0012132 A1  Jan. 8, 2015

Related U.S. Application Data

(63) Continuation of application No. 13/564,313, filed on Aug. 1, 2012, now Pat. No. 8,874,266.

(60) Provisional application No. 61/588,440, filed on Jan. 19, 2012.

(51) Int. Cl.
  *B25J 9/16* (2006.01)
  *G05B 23/02* (2006.01)
  *G06F 9/50* (2006.01)

(52) U.S. Cl.
  CPC ............. *B25J 9/161* (2013.01); *G05B 23/0221* (2013.01); *G06F 9/5072* (2013.01)

(58) Field of Classification Search
  CPC ........ B25J 9/163; B25J 11/002; B25J 9/1682; B25J 9/16; B25J 9/161; G05D 1/0088; G05D 2201/0209; G05D 1/0295; G05D 1/104; G05D 1/0236; G05D 1/0255; G05D 1/0257; G05D 1/0278; G05D 2201/0207; G05D 1/0274; G05B 19/41865; G05B 2219/33334; G05B 2219/31078; G05B 2219/39169; G05B 2219/39155; G05B 23/0221; G01N 23/04; G01N 23/18; G07C 3/146; G06N 5/02; F41H 13/00; F41H 7/005; H04L 67/1002; G06F 9/5072
  USPC ......................... 700/245–253, 254, 257–258; 709/201–203, 248
  See application file for complete search history.

(56) References Cited

U.S. PATENT DOCUMENTS 5,642,467 A   6/1997  Stover et al.
6,826,431 B2  11/2004 Hurtado et al.

(Continued)

*Primary Examiner* — Bao Long T Nguyen
(74) *Attorney, Agent, or Firm* — McDonnell Boehnen Hulbert & Berghoff LLP

(57) ABSTRACT

A method includes receiving first sensor data acquired by a first sensor in communication with a cloud computing system. The first sensor data has a first set of associated attributes including a time and a location at which the first sensor data was acquired. The method also includes receiving second sensor data acquired by a second sensor in communication with the cloud computing system. The second data has a second set of associated attributes including a time and a location at which the second sensor data was acquire. Further, the method includes generating a data processing result based at least in part on the first sensor data, the first set of associated attributes, the second sensor data, and the second set of associated attributes and instructing a robot in communication with the cloud computing system to perform a task based at least in part on the data processing result.

19 Claims, 3 Drawing Sheets

(56) References Cited

U.S. PATENT DOCUMENTS

| | | | |
|---|---|---|---|
| 6,901,352 B2 * | 5/2005 | Woods | G01N 23/04 700/1 |
| 7,480,395 B2 | 1/2009 | Parunak et al. | |
| 7,751,936 B2 | 7/2010 | Kim | |
| 8,060,255 B2 | 11/2011 | Wieland | |
| 8,112,176 B2 | 2/2012 | Solomon | |
| 8,244,469 B2 | 8/2012 | Cheung et al. | |
| 8,346,391 B1 * | 1/2013 | Anhalt | B25J 9/163 700/245 |
| 2004/0030571 A1 | 2/2004 | Solomon | |
| 2007/0088775 A1 * | 4/2007 | Asplund | H04L 67/1095 709/201 |
| 2007/0208442 A1 | 9/2007 | Perrone | |
| 2008/0089531 A1 | 4/2008 | Koga et al. | |
| 2009/0018696 A1 | 1/2009 | Goerick et al. | |
| 2010/0004784 A1 | 1/2010 | Chang et al. | |
| 2011/0035054 A1 | 2/2011 | Gal et al. | |
| 2011/0135189 A1 | 6/2011 | Lee | |
| 2011/0137463 A1 * | 6/2011 | Alcazar | B25J 9/1669 700/259 |
| 2012/0029688 A1 * | 2/2012 | Lager | G05B 19/41865 700/230 |

* cited by examiner

ENHANCING SENSOR DATA BY COORDINATING AND/OR CORRELATING DATA ATTRIBUTES

CROSS REFERENCE TO RELATED APPLICATIONS

The present application is a continuation of U.S. patent application Ser. No. 13/564,313, filed on Aug. 1, 2012, and entitled "Enhancing Sensor Data by Coordinating and/or Correlating Data Attributes," which claims priority to U.S. Provisional Application No. 61/588,440, filed on Jan. 19, 2012, both of which are herein incorporated by reference as if fully set forth in this description.

BACKGROUND

Cloud computing refers generally to the provision of computing resources via a computer network. Common shorthand used for a cloud computing service or an aggregation of existing cloud services is "the cloud." In a traditional model of computing, data and software are entirely contained in a user's device, which may be a personal computer (PC), for example. In cloud computing, however, the user's device is configured to be coupled to computing resources via a computer network and, consequently, may contain relatively little hardware, software, or data. For example, the user's device may include an operating system, a network connection, and a network interface application, such as a web browser, to provide access to the network of computing resources, which may include, for example, servers, processors, hard drives, memory, applications, etc., on the cloud. Thus, the user's device may simply serve as an input device and/or display terminal for processes occurring on the cloud.

Cloud computing may also free the user and the user's device from certain hardware and software installation and maintenance tasks due to applications being performed on computing resources coupled via a wired or wireless link to the cloud. Further, devices coupled to the cloud may have access to the same pool of data and applications. This allows users to store and access personal files such as music, pictures, videos, and bookmarks or play games or use productivity applications remotely rather than physically carrying around a storage medium, such as a DVD or thumb drive, to access such data and/or applications.

In one example, a user's device may by coupled to a host of web servers that run user interface software that collects and interprets commands from the user. In response to the commands, the servers may manage some or all of the necessary computing and can store or retrieve information from database or file servers and cause the user's device to display relevant information. Through cloud computing, data across multiple servers distributed throughout various locations can be used to facilitate collaborative work on a project or task from any number of user devices coupled to the cloud from any location.

SUMMARY

In one example, a method for processing data in a cloud computing system includes acquiring first sensor data having an associated first set of attributes and acquiring second sensor data having an associated second set of attributes. In some embodiments, the first sensor data may be acquired at a first corresponding time and the second sensor data may be acquired at a second corresponding time. The first sensor data and the second sensor data may be acquired by the same sensor in some embodiments. But in other embodiments, the first sensor data and the second sensor data may be acquired by two different sensors. In some embodiments where the first sensor data and second sensor data are acquired by two different sensors, one of the two different sensors may be associated with a first robot and another of the two different sensors may be associated with a second robot. However, in some embodiments, the two different sensors may be associated with the same robot. Further, one or more of the first sensor, the second sensor, the first robot, and the second robot may be in communication with a cloud computing system.

The first set of attributes may include a time and a location at which the first sensor data was acquired and the second set of attributes may include a time and a location at which the second sensor data was acquired. The method may also include processing the first set of attributes and the second set of attributes to localize and synchronize the first sensor data and the second sensor data. The method may further include providing an instruction for a robot to perform a task based at least in part on localized and/or synchronized sensor data.

In another example, a computing device coupled to a cloud computing system may receive a command to execute a task. Generally, the computing device can function as a server device and/or a client device. In response, the computing device may instruct a first client device, such as a robot and/or sensor, coupled to the cloud computing system to collect first sensor data that is relevant to executing the task. In response to receiving the instructions from the computing device, the first client device may (i) acquire the first sensor data, (ii) record a first set of one or more attributes associated with the first sensor data, and (iii) send the first sensor data and associated first set of one or more attributes to the computing device.

If the computing device determines that additional sensor data would be helpful to execute the task, the computing device may instruct the first client device (or alternatively one or more additional client devices) to collect second sensor data. In response to receiving the instructions from the computing device, the first client device (or alternatively the one or more additional client devices) may (i) acquire the second sensor data, (ii) record a second set of one or more attributes associated with the second sensor data, and (iii) send the second sensor data and associated second set of one more attributes to the computing device.

In some embodiments, the computing device may be configured to correlate, compare, combine, or otherwise process the first sensor data and the second sensor data based at least in part on the first set of one or more attributes and the second set of one or more attributes to generate a result. Then, the computing device (alone or in combination with one or more client devices) may then execute the task based at least in part on the generated result.

In yet another example, a cloud computing system includes a computing device configured to receive a request to perform a task. The computing device is configured to receive first sensor data associated with a first set of attributes and to receive second sensor data associated with a second set of attributes. The first sensor data and the second sensor data may be acquired by the same sensor in some embodiments. But in other embodiments, the first sensor data and the second sensor data may be acquired by two different sensors. In some embodiments where the first sensor data and second sensor data are acquired by two different sensors, one of the two different sensors may be associated with a first client device and another of the two different sensors may be associated with a second client device. However, in some embodiments, the two different sensors may be associated with the same client device.

The first set of attributes may include a corresponding time and location at which the first sensor data was acquired and the second set of attributes may include a corresponding time and location at which the second sensor data was acquired. The server device is also configured to process the first set of attributes and the second set of attributes to localize and synchronize the first sensor data and the second sensor data. The server device is also configured to instruct at least one client device to perform the task based at least in part on the localized and/or synchronized sensor data.

In yet another example, a non-transitory computer readable medium has stored therein instructions executable by at least one processor to cause the at least one processor to perform functions. The functions include accessing first sensor data acquired by a first sensor that is in communication with a cloud computing system and accessing second sensor data acquired by a second sensor that is in communication with the cloud computing system. The first sensor data has a first set of associated attributes including a time and a location at which the first sensor data was acquired and the second data has a second set of associated attributes including a time and a location at which the second sensor data was acquired. Further, the functions include generating a data processing result based at least in part on the first sensor data, the first set of associated attributes, the second sensor data, and the second set of associated attributes, and instructing a robot that is in communication with the cloud computing system to perform a task based at least in part on the data processing result.

Other instructions can also be stored on the computer readable medium and can be executable to perform other functions including, for example, processing the first set of attributes and the second set of attributes to localize and synchronize the first sensor data and the second sensor data and providing an instruction for a robot to perform a task based at least in part on localized and/or synchronized sensor data.

The foregoing summary is illustrative only and is not intended to be in any way limiting to the scope of the present disclosure. In addition to the illustrative aspects, embodiments, examples, and features described above, further aspects, embodiments, examples, and features will become apparent by reference to the accompanying figures and the following detailed description.

DETAILED DESCRIPTION

Figure 1:
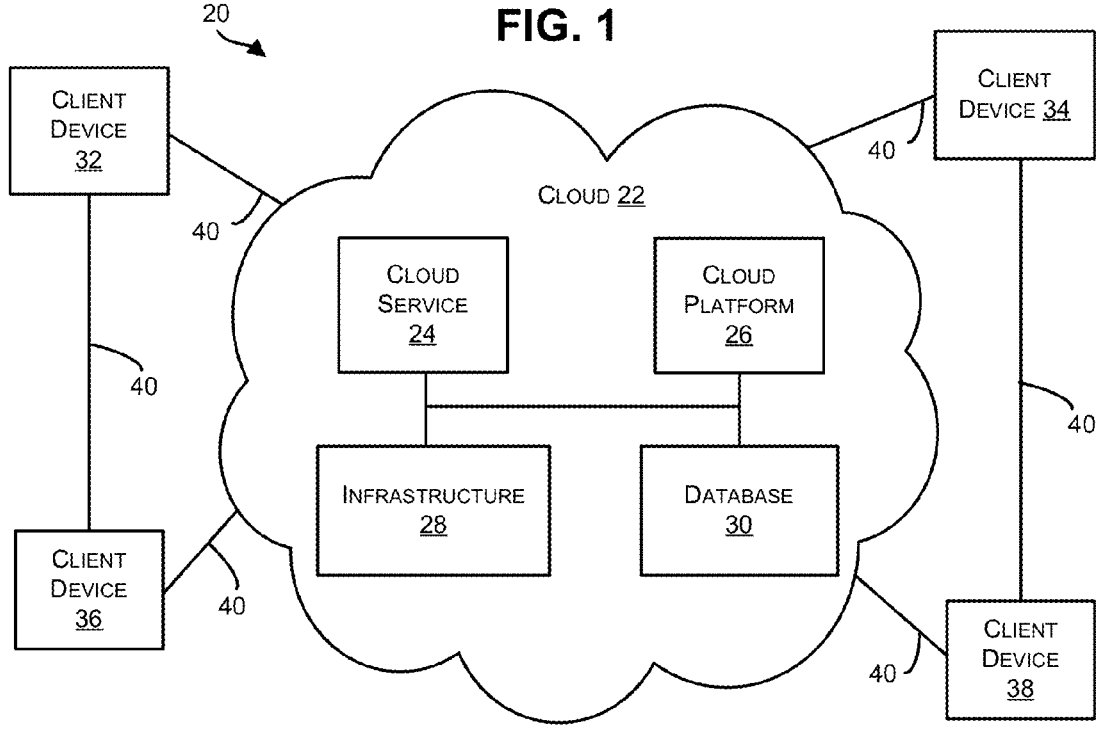
FIG. 1 is a block diagram of a cloud computing system in accordance with one example.

One aspect of the present disclosure is related to collecting sensor data from multiple robots and/or from one robot over a period of time. The sensor data can be collated and/or synchronized utilizing cloud computing resources so that coordinated times, places, and objects corresponding to or otherwise associated with the sensor data can be identified together. Data samples with such commonly identified characteristics can be enhanced or otherwise improved. For example, the data samples can be processed to remove noise, stitch together a sequence of sounds, create composite or panoramic views, and/or generate 3D stereoscopic views or 3D models, etc. The enhanced sensor data can be stored for future reference and/or used to initiate other functions, such as, for example, to instruct one or more robots to perform a specific command and/or to collect additional data.

More generally, the present disclosure is related to processing data, such as data from one or more sensors, in the broad context of cloud computing over a computer network in which computing resources, application execution, data storage, etc., may be divided, to some extent, between client and server devices. Generally, a client device is a computing device that accesses a resource or service on the cloud, and a server device is a computing device that is communicatively coupled to the cloud and provides resources or services to client devices. In some instances, a computing device communicatively coupled to the cloud can function simultaneously and/or intermittently as both a client device and a server device.

In one example, the client device is configured as a robot that that can be utilized to perform a task. The robot may be configured to interact with its surrounding environment utilizing a mechanical, electrical, and/or electromechanical actuation capability. In one example, the actuation capability allows the robot to manipulate objects and/or to be mobile or navigate within an environment. Alternatively or in conjunction, the robot may include one or more sensors, such as, for example, microphones, still or video cameras, ambient light sensors, proximity and distance sensors, global positioning system (GPS) sensors, gyroscopes, accelerometers, biosensors, wireless network transceivers, etc. In one example, sensors are configured as hardware and/or software modules that can be made available to the robot as needed or desired. Such modules can be made available to the robot in a wired and/or wireless manner. In some examples, a robot is configured to be coupled via a wired or wireless link to a second device or module, such as mobile phone or laptop. The second device or module may be configured to function as a controller of the robot and to provide additional sensor modules or other device modules.

In the present disclosure, a plurality of client devices can communicate with local and/or remote computing resources on the cloud to share data, program instructions, applications, modules, processing capabilities, and the like. The computing resources accessible via the cloud can be shared between one or more client devices on a real-time (or near real-time) basis. Parts of the shared data and program instructions may be dynamically delivered, as needed or otherwise, to various client devices via the cloud. Some details of the cloud architecture may be transparent to users of client devices. Thus, a user of a client device may not be aware that the client device is downloading application logic or instructions and data from the cloud or that the client device is offloading processing or storage functions to the cloud, for example.

Utilizing shared computing resources, at least in part, a client device can be controlled to perform actions or commands, such as to interact with an environment and to obtain or acquire sensor data relating to the environment. The acquired sensor data can be associated with various attributes relating to the acquisition thereof, such as, for example, the times and/or places that the sensor data was acquired. The sensor data can include different types of data, such as acoustic signals, image data, temperature, location and distance data, etc. Further, the acquired sensor data (and its associated attributes) can be shared through the cloud and enhanced to facilitate various functions, such as, for example, object recognition, object inventorying, voice recognition, command interpretation, navigational functions, etc.

In one example, a client device, such as a robot with an actuation capability, receives a command to perform one or more processes to identify or recognize objects in an area and to inventory the objects in the area. Such processes may include controlling one or more sensors to obtain various types and amounts of sensor data relating to the area and the objects located therein. The one or more sensors can be physically or communicatively coupled to the client device or perhaps to one or more other client devices. Alternatively, some of the one or more sensors can be distributed throughout the area in which the robot is operating. For example, some of the one or more sensors could correspond to cameras or microphones integrated with other objects in the area, e.g., a camera and/or microphone integrated with a computer, computer monitor, mobile phone, or security system, for example.

Once the sensor data has been acquired, the sensor data can then be shared with other devices (e.g., server devices, other client devices, other robots, etc.) via the cloud and used to facilitate the processes of object recognition and inventorying. For example, a server device can combine the shared data, based on attributes thereof, such as, acquisition times and/or locations, to enhance the processes of object recognition and inventorying. Illustratively, a number of client devices that are distributed at different locations throughout a room can capture images of objects in the room from different perspectives and/or at different times. The server device can process, analyze, and/or combine the images, based on the location and time acquisition attributes, to better enable an identification of the objects. Further, the server device may perform additional processing on the data to enhance and remove noise from the data. Still further, different types of data, such as audio data, temperature data, and the like, can be processed in accordance with the concepts disclosed herein.

Referring now to the figures, FIG. 1 illustrates a cloud-based computing system 20 according to one example of the present disclosure. In FIG. 1, the system 20 includes a cloud 22 that represents a networked architecture of computing resources. Further, the cloud 22 in FIG. 1 includes a cloud service 24, a cloud platform 26, a cloud infrastructure 28, and a database 30. In other examples, the cloud 22 may include additional of fewer functional and/or physical components. In addition, the cloud service 24, the cloud platform 26, the cloud infrastructure 28, and the database 30 of FIG. 1 may include other elements or components that are not specifically illustrated in FIG. 1. Generally, one or more functional or physical components of the system 20 may be divided into additional functional or physical components or combined into fewer functional or physical components. Delivery of cloud computing resources may involve multiple clouds 22 or cloud components that communicate with each other over application programming interfaces, such as web services or multi-tier architectures, for example.

Generally, the cloud 22 represents a networked architecture of computing resources and, in one example, the cloud service 24 represents a queue for handling requests from client devices coupled to the cloud. The cloud platform 26 may include a frontend of the cloud 22 and may be coupled to the cloud service 24 to perform functions to interact with client devices. The cloud platform 26 may provide applications used to access the cloud 22 via a user interface, such as a web browser. The cloud infrastructure 28 may include service applications for billing components of the cloud 22 and, thus, may interact with the cloud service 24. The database 30 may represent storage capabilities of the cloud 22 and may be accessed by any of the cloud service 24, the cloud platform 26, the infrastructure 28, and client devices.

The system 22 of FIG. 1 includes a number of client devices 32-38 that can be configured to communicate with the cloud 22 and to each other by wired and/or wireless communication connections 40. In other examples, additional or fewer client devices may communicate with the cloud 22. In some examples, the devices 32-38 are configured to collect and upload data to the cloud 22. The cloud 22 may be configured to perform calculations or analysis on the data and return processed data to the device 32-38. In another example, the collected data can be uploaded to another local or remote device coupled to the cloud 22 for processing and analysis.

By way of non-limiting examples, the devices 32-38 may include any type of device with computing capabilities, such as a PC, laptop computer, tablet computer, smart appliance, electronic home security systems, etc. and/or any type of general mobile computing device, such as a personal digital assistant, GPS device, cellular telephone, smart phone, portable gaming device, etc. In addition, the devices 32-38 may include robot devices that generally may comprise a computing device that has connection capabilities to the cloud 22 and that has an actuation capability, such as mechanical, electrical, and/or electromechanical capabilities. Generally, the devices 32-38 may include one or more of a display system, memory, input/output components, a network connection, and a processor.

Further, any of the client devices 32-38 may include one or more sensors, such as a gyroscope or an accelerometer, GPS sensors, optical sensors, infrared sensors, sonar, biosensors, radio frequency identification systems, near field communication chips, wireless network transceivers, compasses, among others.

In addition, any of the client devices 32-38 may include an integrated user-interface that allows a user to interact with the device. For example, the devices 32-38 may include various buttons and/or a touchscreen interface that allow a user to provide input to the device. In another example, the client device 32-38 may include a microphone configured to receive voice commands from a user. Furthermore, the devices 32-38 may include one or more interfaces that allow various types of secondary devices or modules to be connected thereto, as will be described in more detail hereinafter.

In FIG. 1, the communication connections 40 between client devices 32-38 and the cloud 22 may include wired connections, such as a serial or parallel bus. The communication connections 40 may also be wireless links that utilize, for example, Bluetooth, IEEE 802.11, which may refer to IEEE 802.11-2007, IEEE 802.11n-2009, or any other IEEE 802.11 revision, and the like.

In other examples, the system 20 may include access points through which the client devices 32-38 may communicate with the cloud 22. Access points may take various forms, for example, an access point may take the form of a wireless access point (WAP) or wireless router. As another example, if a client device 32-38 is coupled using a cellular air-interface protocol, such as a CDMA or GSM protocol, an access point may be a base station in a cellular network that provides Internet connectivity via the cellular network.

As such, the client devices 32-38 may include wired or wireless network interfaces through which the client devices can by coupled to the cloud 22 (or access points). As an example, the client devices may be configured to use one or more protocols such as 802.11, 802.16 (WiMAX), LTE, GPRS, CDMA, EV-DO, and/or HSPDA, among others. Furthermore, the client devices may be configured use multiple wired and/or wireless protocols, such as "3G" or "4G" data connectivity using a cellular communication protocol, for example, CDMA, GSM, or WiMAX, as well as for "WiFi" connectivity using 802.11. Other examples are also possible.

Figure 2:
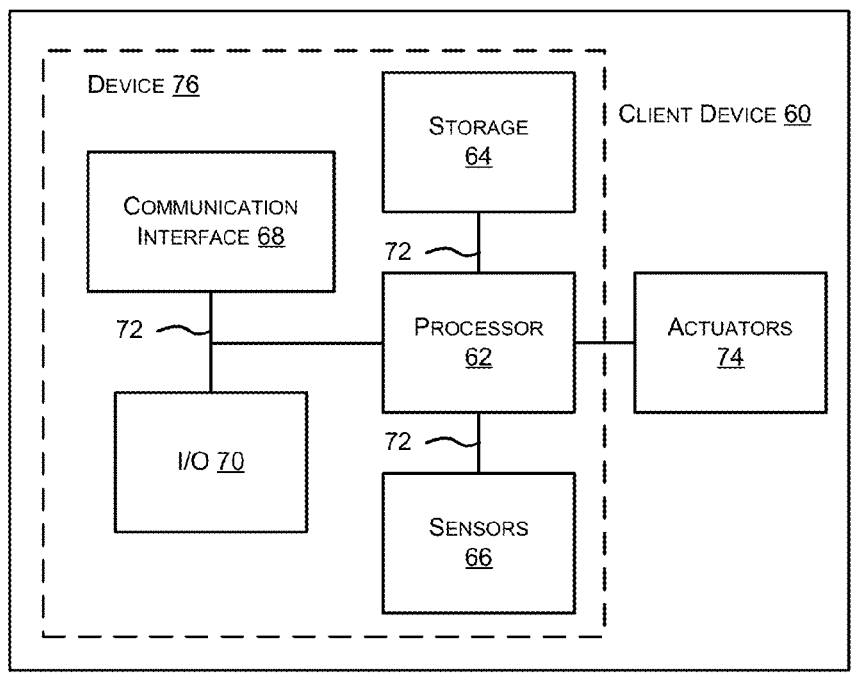
FIG. 2 is a block diagram of a client device in accordance with one example.

FIG. 2 illustrates an example client device 60 that includes a processor 62, memory or storage 64, one or more sensors 66, a communication interface or connection 68 for coupling the device to the cloud, and one or more input/output (I/O) components 70. In FIG. 2, the processor 62, memory or storage 64, sensor(s) 66, communication interface 68, and I/O component(s) 70 are coupled together by one or more wired or wireless connections 72. In other examples, the device 60 may include additional or fewer components without departing from the spirit of the present disclosure.

Generally, the processor 62 may be configured to operate the device 60 in accordance with an operating system, program instructions, and other data stored in the storage 64. In one example, one or more of the operating system, program instructions, and other data, or portions thereof, can be stored on or otherwise accessible via the communication interface 68 from the cloud 22. The communication interface 68 can be a wired and/or wireless communication interface to access the cloud 22. A wired interface may include, for example, a parallel bus or a serial bus, such as a Universal Serial Bus (USB). A wireless interface may utilize, for example, Bluetooth, IEEE 802.11, cellular (such as GSM, CDMA, UMTS, EV-DO, WiMAX, or LTE), or Zigbee, among other possibilities.

The storage 64 may also be configured to store data from the one or more sensors 66 of the device 60 and the processor 62 may be configured to interpret the data from the sensors. Data from the sensors 66 can also be made accessible through the cloud 22 for processing by computing resources coupled thereto. Further, the sensors 66 can be coupled to the client device 60 locally or remotely via the wired or wireless connection 72. Non-limiting example sensors 66 may include smoke sensors, light sensors, proximity sensors, distance sensors, radio sensors, infrared sensors, microphones, gyroscopes, accelerometers, cameras, radar, capacitive sensors, touch sensors, compasses, GPS sensors, temperature sensors, etc.

Further, the processor 62 may be configured to processes inputs from the I/O device(s) 70 and to control outputs to the I/O devices. The I/O devices 70 may include, for example, a touch panel, keypad, mouse, microphone, speaker, display panel, and the like.

The client device 60 may also include components or devices that allow the client device to interact with its environment. For example, the client device 60 may include one or more actuators 74, such as motors, wheels, articulating grippers, movable arms, legs, head, etc., that enable the device to physically move or interact with objects in its environment.

In one example, the client device 60 is a robot that is controlled according to an operating system designed for specific functions of the robot. The robot operating system may provide libraries and tools, such as hardware abstraction, device drivers, visualizers, message-passing, package management, program instructions, etc., to enable robot executable applications. Examples of robot operating systems include open source or proprietary software such as ROS (robot operating system), DROS (Dave's ROS), ARCOS (advanced robotics control operating system), ROSJAVA, and the like. A robot operating system may include publish and subscribe functionality and may also include functionality to control components of the robot, such as head tracking, base movement, actuation of articulating arms, legs, grippers, etc.

In some examples, various sensors and devices on the client device 60 are configured as modules. Such modules may be physical components coupled to the client device 60 and/or software or other programming instruction modules that are executed locally or remotely for the client device. Different modules may be added or removed from the client device 60 depending on requirements of the client device. For example, in a low power situation, the device 60 may utilize fewer modules to reduce power consumption. In another example, additional physical sensor or software modules can be added to increase an amount of data the device 60 is able to collect.

In some examples, the client device 60 may be configured to communicate via a wired and/or wireless connection to a computing device, such as a device 76. The device 76 can be considered a module and may include one or more of the processor 62, the storage 64, the sensors 66, the communication interface 68, and I/O components 70. For example, the client device 60 can be a robot that has a number of actuators, for example, a movable base and articulating arms and grippers, and the client device may be configured to receive the device 76, for example, a smartphone or laptop, that is configured to control one or more components of the robot.

In one example, the client device 60 may be a relatively basic device without one or more of the sensors 66, communication interface 68, or I/O components 70. In the present example, the client device 60 can be operatively coupled to the device 76, which can provide one or more of the sensors 66, communication interface 68, I/O components 70, and other components to the client device.

The device 76 can be a smartphone or other mobile device that provides an interactive display to control the client device 60. A smartphone can also provide additional peripheral components and sensing capabilities to the device 60, such as a wired or wireless communication interface to the cloud, processing capabilities, communication capabilities of the phone, an accelerometer, gyroscope, compass, GPS, camera, a touch screen or other input device, proximity sensor, ambient light sensor, etc. Thus, the smartphone may enable the client device 60 to communicate with the cloud 22 and to download or otherwise access routines, applications, program instructions, and other data from the cloud. For example, a laundry folding routine may be stored on the cloud 22 and a user may be able to select such routine using the device 76, such as a smartphone, to download the routine from the cloud onto the device. When the device 76 is placed into or otherwise coupled to the client device 60, the client device with suitable actuators 74 and other components can be controlled to perform the downloaded routine.

As described above with respect to FIG. 1, various client devices, such as the client device 60, may be in communication with the cloud 22 and its network of computing resources. For example, the client device 60 may access data, applications, processing resources, and the like from the cloud 22 and other client devices 32-38 in communication with the cloud 22. Further, the cloud 22 may access data, applications, processing resources, and the like from client devices 32-38, 60 coupled to the cloud 22. The data from each client device 32-38, 60 in communication with the cloud 22 can be compiled into a larger data set that can be accessed and shared by other devices in communication with the cloud 22. In this manner, client devices, such as robots, can share experiences with other client devices to enable learned behaviors. Further, the shared data can be processed to identify data samples with common characteristics, and such data samples can be enhanced to facilitate the execution of various tasks or commands, as described herein.

Illustratively, the client device 60 can be communicatively coupled to the cloud 22 and may include sensors 66 to detect characteristics of a surrounding environment and actuators 74 to provide motor control for the device. Output data from the sensors 66 can include acoustic signals, image data, location data, distance data, etc. The sensor output data can be provided to the cloud 22, which can process the data to enable the client device 60 and other client devices to perform functions, such as identifying and interacting with objects in the environment. In some embodiments, the processing of the sensor data can be performed entirely by the cloud 22 or can be divided between one or more client devices and the cloud.

In one example, one or more sensors 66 coupled to one or more client devices can be controlled to capture images of an object. An object recognition application available via the cloud 22 may be configured to identify the object in the images. In another example, additional images of the object can be captured from one or more sensors coupled to the same or different client devices. For example, the additional images of the object may be captured from different perspectives and/or captured at different times. The multiple captured images can then be utilized to improve or aid in the identification of the object. Generally, the identity of the object can be used to determine or retrieve additional information relating to the object. Such additional information can be stored in the database 30 and may include, for example, a location, size, weight, color, model number, instructions for use, etc. of the object.

In still another example, a first client device 32 may build a map of an area and a second client device 34 can later download or otherwise access the map to obtain information regarding the area. Further, the second client device 34 can update the map created by the first client device 32 with additional information that the second client device 34 may have learned about the area. For example, the second client device 34 may include different types of sensors that the first client device 32 did not have. For example, the second client device 34 may be equipped with (or otherwise able to access or use) a camera, an RFID scanner, a temperature sensor, or other type of sensor that the first client device 32 may not have been equipped with (or otherwise had access to) at the time that it built the map. In this example, the second client device 34 can utilize its sensors to acquire additional information regarding the area to update the map. For example, the second client device 34 might update the map with temperature information, light intensity information, and/or the identity of other objects that may be located in the area. Thus, in operation, the first client device 32 and the second client device 34 are able to share data that each has collected. This sharing of data enables faster adaptation, such that one device can build upon a learned experience or other information previously gathered by another device.

Figure 3:
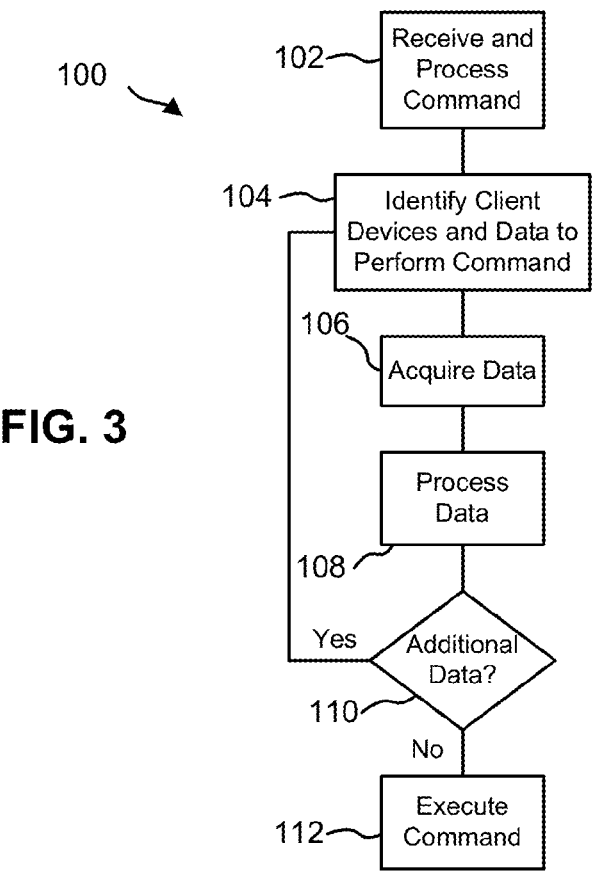
FIG. 3 is a flowchart of a method or algorithm that can be executed to process a command for a client device to perform a task.

FIG. 3 shows a method 100 that can be executed to process a command for a client device to perform a task. For example, a client device (such as any of the client devices 32-38 and 60 shown and described with respect to FIGS. 1 and 2) can be instructed to perform a command that includes acquiring data related to an environment. In some embodiments, acquiring data related to an environment may include acquiring data from sensors.

In the method 100 illustrated in FIG. 3, block 102 includes receiving a command or request to perform a task and processing the command to interpret or define the command. The command may be received by a client device 32-38, 60 (FIGS. 1-2) or may be received by a server device associated with the cloud 22 (FIG. 1). In various examples, the command or request can be an audible command spoken by a user, a manually initiated command entered by a user on an input device, and/or a command that is generated based on a schedule or other triggering event. In some embodiments, a client device that receives a command from a user may in turn relay the command to a server device associated with the cloud.

Once a command has been received and interpreted, the command can then be assigned to one or more client devices for execution. For example, block 104 includes identifying one or more relevant client devices and relevant data that can be utilized to execute the task. The block 104 can also include identifying various characteristics of the relevant client devices, such as, for example, locations, sensor capabilities, and actuation capabilities of the relevant client devices. In one example, the block 104 may include utilizing the identification of the relevant client devices (and characteristics thereof) and the relevant data to plan the execution of the task.

Block 106 includes acquiring relevant data for executing the task. For example, the block 106 can include controlling one or more sensors to acquire sensor data. The sensors may be physically or wirelessly coupled to a client device, and the sensors may be controlled to acquire images of various objects in a room along with other data regarding the objects and/or the room. In one example, block 106 also includes identifying various attributes relating to the acquired sensor data, such as times and/or locations that the sensor data was acquired. The attributes of the acquired sensor data can also include parameters or other details related to the one or more sensors that were controlled to acquire the sensor data. Such parameters may include, by way of non-limiting example, an orientation, resolution, and magnification of a camera or other image sensor that was used to acquire or capture the images.

Block 108 includes processing the acquired sensor data, the attributes associated with the acquired sensor data, and perhaps other data and attributes accessible via the cloud, for example. Next, decision block 110 includes determining whether additional data is needed or would be helpful for executing the task. For example, the decision block 110 may include determining whether the acquired sensor data is sufficient to reliably identify a particular object. If the acquired sensor data is sufficient to reliably identify the particular object, then control passes to block 112, which includes performing one or more tasks associated with executing the command. For example, the one or more tasks may include identifying the object, providing instructions for using the object, and then using (e.g., moving, retrieving, etc.) the identified object according to the provided instructions.

However, if a determination is made at decision block 110 that additional data is necessary or would be helpful, then control passes back to the block 104. Additional data may be necessary or helpful in situations when a particular object cannot be identified or at least not identified to within a desired threshold of certainty. After control passes back to block 104, the same client device or a different client device can be instructed to acquire additional sensor data regarding the particular object. For example, at block 104, another client device can be selected to acquire images of the object from different perspectives. Alternatively or in conjunction, a client device can be controlled or instructed to acquire or access other local or remote sensor modules to acquire additional sensor data. For example, a client device can be controlled or instructed to access a distance sensor to determine a distance of the object from the sensor and the client device. Thereafter, control passes to the blocks 106-112, as described above.

Figure 4:
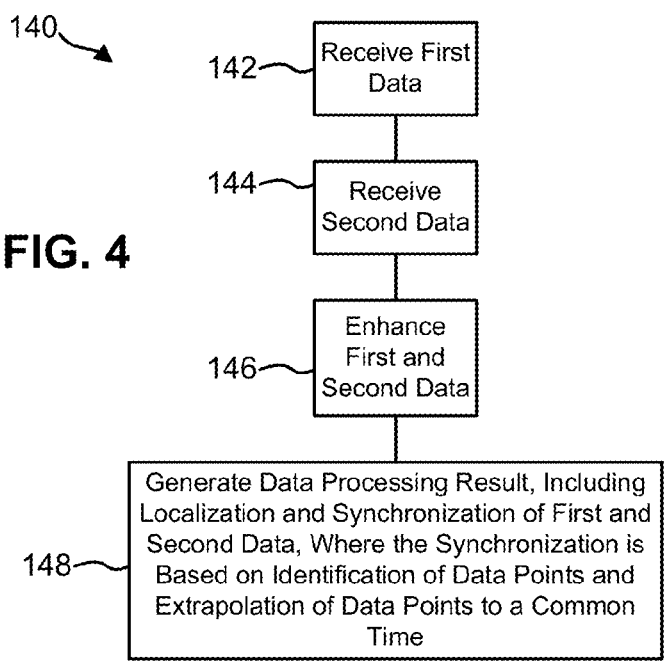
FIG. 4 is a flowchart of a method or algorithm that can be executed to process data for use in performing a task.

FIG. 4 shows a flowchart that illustrates a method 140 that can be executed to process and enhance multiple data samples with coordinated attributes to obtain a data processing result for use in performing a task. In one example, the method 140 can be performed during the execution of the method 100 of FIG. 3, such as during the execution of block 108. In FIG. 4, the method 140 includes block 142 that includes acquiring first sensor data. Generally, the first sensor data is data that can be utilized to execute a task and such data can include the data acquired during execution of block 106 of FIG. 3, for example. In addition, the block 142 may also include acquiring a first set of attributes relating to the first sensor data. Illustratively, the first sensor data can include a first image of a first perspective of an object to be identified. In the present example, the first set of attributes may include a location from which the first image was acquired, a time at which the first image was acquired, and a distance between the object in the first image and the sensor that acquired the first image.

The method 140 also includes block 144 that includes receiving second sensor data. Similarly, the second sensor data is generally relevant data that can be utilized to execute a task and such data can include the data obtained during the execution of block 106 of FIG. 3, for example. Illustratively, the second sensor data can include a second image of a second perspective of the object to be identified. Likewise, the block 144 may also include acquiring a second set of attributes relating to the second sensor data, such as, for example, a location from which the second image was acquired, a time at which the second image was acquired, and a distance between the object in the first image and the sensor that acquired the second image.

The method 140 also includes block 146 that includes enhancing or otherwise modifying the first sensor data and the second sensor data to obtain a data processing result. Enhancing and/or modifying the first and second sensor data may include removing noise from the data or interpolating the data to construct additional data points. The first sensor data and the second sensor data can be enhanced independently or can be enhanced collectively using the first sensor data to enhance the second sensor data and vice versa, for example.

Additionally, block 146 may also include utilizing the first set of attributes and/or the second set of attributes to enhance the first sensor data and the second sensor data. In one example, the first sensor data and the second sensor data may also include audio data, and block 146 may further include utilizing the first and second sets of attributes (including, for example, locations where the audio data was acquired and times when the audio data was acquired) to remove background sounds and/or other noise.

In another example, the first sensor data and second sensor data may also include images of an object from different perspectives. In this example, block 146 includes utilizing the first and/or second sets of attributes (including, for example, locations where the images were acquired and times when the images were acquired) to improve image processing by isolating the image from a background and/or foreground, for example. In yet a further example, the steps and/or functions of block 146 can be omitted or combined with other steps and/or functions of other blocks of the methods 100, 140. For example, the steps and/or functions of block 146 can be combined with block 148 of FIG. 4.

More particularly, block 148 includes combining or correlating the first sensor data and second sensor data. In one example, block 148 may include combining or correlating the first sensor data and second sensor data by utilizing the first set of attributes and/or second set of attributes to localize and/or synchronize the first sensor and second sensor data. Generally, localizing the first and second sensor data may include identifying relative locations of sensors that acquired the first and second sensor data and/or identifying relative locations of an object or signal source with respect to the sensor locations. Further, synchronizing the first and second sensor data may generally include identifying times when the first and second sensor data were acquired and extrapolating the first and second sensor data to a common time or period. For example, extrapolating the first and second sensor data to a common time or period may be helpful to combine common characteristics of the sensor data, such as audio and images.

In one example, the first and second sensor data includes images of an object from different perspectives. At block 148, the first and second sets of attributes (including, for example, locations where the images were acquired and times when the images were acquired) can be utilized to identify the same object in each image and/or to combine the first and second sensor data to obtain a more detailed representation of the object in the images. Such combined sensor data can then be used to identify the object in accordance with a command to inventory a room, for example.

In another example, the first sensor data and second sensor data may include audio data, such as an audible command spoken by an individual. In the present example, the first sensor data may include audio data of a first portion of the audible command and the second sensor data may include audio data of a second portion of the audible command. At block 148, the first and second sets of attributes (including, for example, locations where the first and second sensor data were acquired and times when the first and second sensor data were acquired) can be used to combine the first and second sensor data and construct the audible command spoken by the individual. The audible command can be then be executed by one or more client devices alone or in combination with one or more server devices, all of which may be in communication with one another via the cloud.

In yet another example, the first sensor data may include audio data and the second sensor data may include an image of an object. At block 148, the first and second sets of attributes (including, for example, locations where the audio data and image were acquired and times when the audio data and the image were acquired) can be used to combine the first sensor data (i.e., the audio data) and second sensor data (i.e., the image) to determine that the particular object shown in the image made a particular sound at a particular time. In yet a further example, the first and second sensor data may also include temperature data at particular times and locations. In this further example, block 148 may include combining the first and second sensor data to obtain temperature data for other times and locations by interpolation or other techniques.

The methods 100, 140 of FIGS. 3 and 4, respectively can be used with a cloud computing system, such as the system 20 of FIG. 1, and any of the client devices 32-38, 60 of FIGS. 1 and 2. The methods 100, 140 may include one or more operations, functions, or actions as illustrated by any one or more of blocks 102-112, 142-148. Although the blocks 102-112, 142-148 are generally illustrated in a sequential order, the blocks may also be performed in parallel, and/or in a different order than described herein. Also, methods 100, 140 may include additional or fewer blocks, as needed or desired. For example, the various blocks 102-112, 142-148 may be combined into fewer blocks, divided into additional blocks, and/or removed based upon a desired implementation.

In addition, each block 102-112, 142-148 may represent a module, a segment, or a portion of program code, which includes one or more instructions executable by a processor for implementing specific logical functions or steps in the process. The program code may be stored on any type of computer readable medium or storage device including a disk or hard drive, for example. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, one or more of the blocks 102-112, 142-148 may represent circuitry that is wired to perform the specific logical functions of the method 100, 140.

Figure 5:
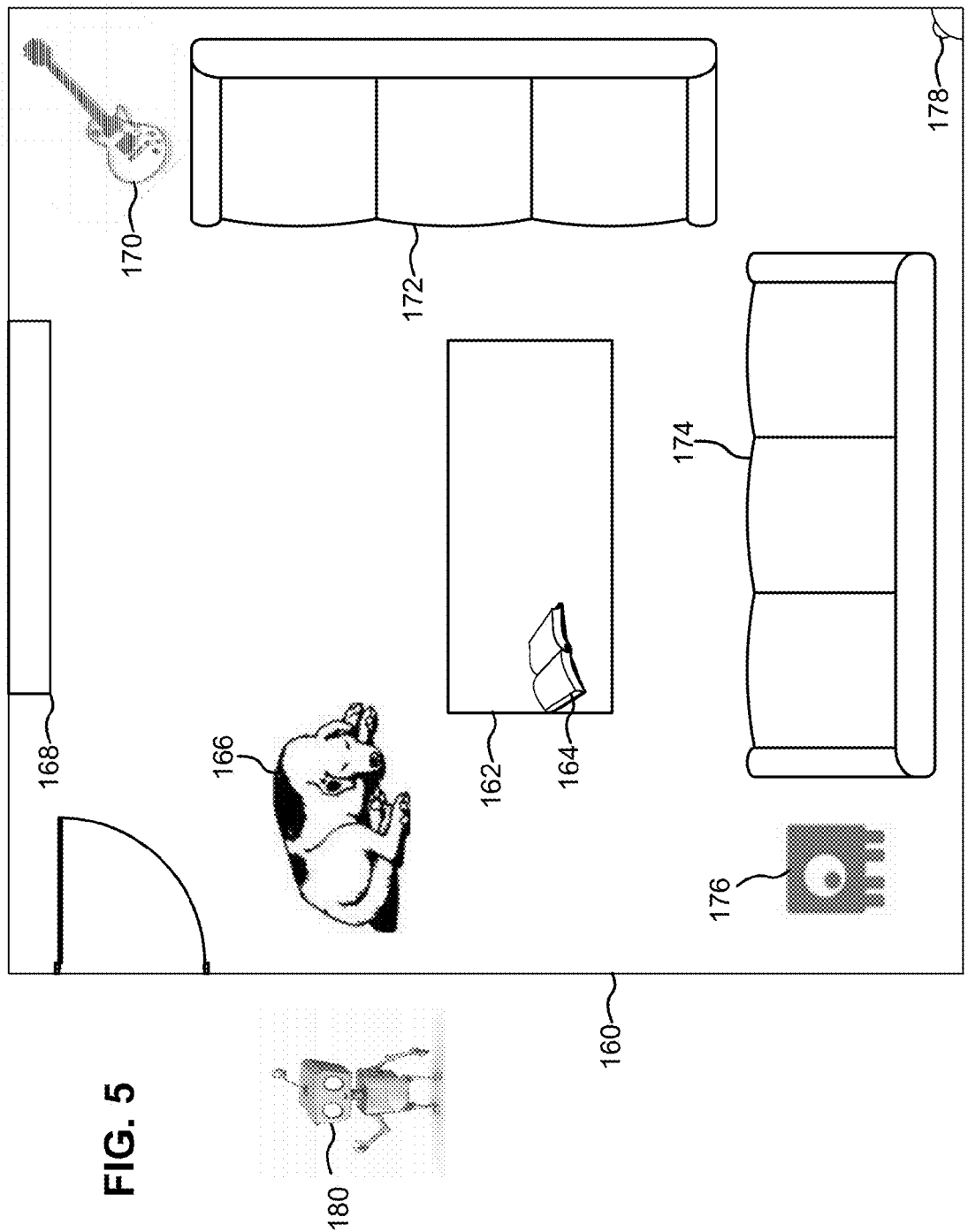
FIG. 5 is a diagrammatic view of an area in which a task can be performed, according to an example.

Referring now to FIG. 5, an environment is illustrated where one or more client devices can be controlled to collect sensor data and perform tasks. More particularly, FIG. 5 illustrates a room 160 with various objects 162-174 disposed therein, client devices 176, 178 located inside the room, and a client device 180 located outside the room. In the example of FIG. 5, the objects 162-174 include a table 162, a book 164, a pet 166, a television 168, a guitar 170, a first couch 172, and a second couch 174. Further, in FIG. 5, the client devices 176, 180 are configured as robots with sensors and actuation capabilities and the client device 178 is a security system with various sensors.

With further reference to the methods 100, 140 of FIGS. 3 and 4, in one example, block 102 includes receiving and processing a command to inventory the objects in the room 160. Block 104 includes identifying relevant client devices and relevant data needed to execute the task. In the present example, client devices 176-180 are identified as being in the vicinity of the room 160 and as having access to suitable sensors, such as, for example, cameras, distance sensors, bar code scanners, RFID transceivers, etc., for collecting the relevant data. After identifying the client device 178 as being in the room 160, the client device 178 can be instructed to begin collecting data for use in inventorying the objects 162-174. However, in other examples, the client device 176 and/or the client device 180 can be selected (in addition to or instead of the client device 178) to inventory the objects 162-174.

In the present example, client device 178 can be controlled to acquire images and other data (e.g., attributes associated with the images) relating to the various objects 162-174 in the room 160. The acquired images and other data can then be processed according to the method 140. If additional data is needed, then any of the client devices 178, 176, 180 can be instructed to acquire additional sensor data. For example, the image data acquired by the client device 178 may be sufficient to generally identify the table 162, the book 164, the pet 166, the television 168, an obstructed view of the object 170, the first couch 172, and the second couch 174.

However, in the present example, additional data may be required to identify more particularly a model of the television 168, the identity of the object 170, and a title of the book 164. Consequently, t another client device, such as the client device 176 and/or the client device 180 can be instructed to identify and/or acquire additional relevant data, such as a model number of the television 168, an ISBN of the book 164, and an unobstructed image of the object 170. Thus, the client device 176, for example, can be instructed to move closer to the book 164 and scan a barcode of the book, to move closer to the television 168 to acquire images of sides of the television where the model number may be located, and to move closer to the object 170 to obtain an image of the object 170 from a different perspective. Such additional data can then be processed according to the method 140. For example, the additional data can be combined and/or correlated with the earlier-obtained data to identify the objects in the room. If still additional data is needed to identify one or more of the objects in the room, then one or more of the client devices 178, 176, 180 can be instructed to acquire additional data.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
receiving first sensor data acquired by a first sensor that is in communication with a cloud computing system, wherein the first sensor data has a first set of associated attributes including a location at which the first sensor data was acquired, wherein the first sensor data is associated with at least one object in an environment in which one or more robots reside, and wherein the one or more robots are in communication with the cloud computing system;
receiving second sensor data acquired by a second sensor that is in communication with the cloud computing system, wherein the second data has a second set of associated attributes including a location at which the second sensor data was acquired, and wherein the second sensor data is associated with the at least one object in the environment;
generating a data processing result based at least in part on the first sensor data, the first set of associated attributes, the second sensor data, and the second set of associated attributes, wherein the data processing result includes a localization of the first sensor data and the second sensor data; and
in response to the data processing result being indicative of a threshold high level of certainty of an identification of the at least one object, wherein the data processing result being indicative of the threshold high level of certainty of the identification is based at least in part on the localization being conclusive, providing instructions to the one or more robots to perform a task associated with the identified at least one object.

2. The method of claim 1, wherein the first sensor data includes one or more of a first image of the at least one object and a first audio signal generated by the at least one object, wherein the second sensor data includes one or more of a second image of the at least one object and a second audio signal generated by the at least one object, wherein the first image and the second image include images of the at least one object from different perspectives, and wherein the first audio signal and the second audio signal are different audio signals generated by the at least one object.

3. The method of claim 1, wherein the first sensor data includes a first acoustic signal that represents an audible command, wherein the second sensor data includes a second acoustic signal that represents the audible command, and wherein the instructions are related to executing the audible command.

4. The method of claim 1, further comprising:
removing noise from at least one of the first sensor data and the second sensor data based at least in part on one or more of the first set of associated attributes and the second set of associated attributes.

5. The method of claim 1, wherein at least one of the one or more robots includes a mechanical actuator.

6. The method of claim 1, wherein one or more of the first sensor and the second sensor are one and only one sensor.

7. The method of claim 1, wherein the one or more robots include at least a first robot and a second robot, wherein the first sensor is associated with the first robot, and wherein the second sensor is associated with the second robot.

8. The method of claim 7, wherein at least one of the first sensor and the second sensor is in wireless communication with the first and second robots, respectively.

9. The method of claim 1, wherein the localization is based on an identification of a location of the first sensor relative to the at least one object and an identification of a location of the second sensor relative to the at least one object.

10. The method of claim 1, wherein the first set of associated attributes further includes a time at which the first sensor data was acquired, wherein the second set of associated attributes further includes a time at which the second sensor data was acquired, wherein the data processing result further includes a synchronization of the first sensor data and the second sensor data, and wherein the synchronization is based at least in part on (i) an identification of one or more data points from the first sensor data and the second sensor data and (ii) an extrapolation of the identified data points to a common time.

11. The method of claim 1, wherein providing instructions to the one or more robots to perform the task associated with the identified at least one object comprises providing instructions to the one or more robots to interact with the identified at least one object.

12. A cloud computing system, comprising:
a computing device configured to receive a request to perform a task, wherein the computing device is configured to communicate with the cloud computing system to:
receive first sensor data associated with first attributes and acquired by a first sensor, wherein the first attributes include a location at which the first sensor data was acquired, and wherein the first sensor data is associated with at least one object in an environment,
receive second sensor data associated with second attributes and acquired by a second sensor, wherein the second attributes include a location at which the second sensor data was acquired, and wherein the second sensor data is associated with the at least one object in the environment,
process the first attributes and the second attributes to localize the first sensor data and the second sensor data and to generate a data processing result representative of the localized first sensor data and second sensor data, and in response to the data processing result being indicative of a threshold high level of certainty of an identification of the at least one object, wherein the data processing result being indicative of the threshold high level of certainty of the identification is based at least in part on the localization being conclusive, provide instructions to perform the task, wherein the task is associated with the identified at least one object.

13. The system of claim 12, wherein the first sensor data and second sensor data include acoustic signals that represent an audible command, and wherein the computing device is configured to communicate with the cloud computing system to provide instructions to execute the audible command.

14. The system of claim 12, wherein the computing device is configured to communicate with the cloud computing system to process at least one of the first attributes and the second attributes to remove noise from at least one of the first sensor data and the second sensor data.

15. The system of claim 12, wherein the computing device is a server device and the instructions are for a client device to perform the task, and wherein the client device includes a mechanical actuator.

16. The system of claim 12, wherein the first sensor data is received from a first client device that is in communication with the cloud computing system, wherein the first sensor is coupled to the first client device, wherein the second sensor data is received from a second client device that is in communication with the cloud computing system, wherein the second sensor is coupled to the second client device.

17. The system of claim 12, wherein the first attributes further include a time at which the first sensor data was acquired, wherein the second attributes further include a time at which the second sensor data was acquired different from the time at which the first sensor data was acquired, wherein processing the first attributes and the second attributes further comprises processing the first attributes and the second attributes to synchronize the first sensor data and the second sensor data, wherein the data processing result is further representative of the synchronized first sensor data and the second sensor data, and wherein synchronization of the first sensor data and the second sensor data is based at least in part on (i) an identification of one or more data points from the first sensor data and the second sensor data and (ii) an extrapolation of the identified data points to a common time.

18. A non-transitory computer readable medium having stored therein instructions executable by at least one processor to cause the at least one processor to perform functions comprising:
accessing first sensor data acquired by a first sensor that is in communication with a cloud computing system, wherein the first sensor data has a first set of associated attributes including a time at which the first sensor data was acquired, wherein the first sensor data is associated with at least one object in an environment in which one or more robots reside, and wherein the one or more robots are in communication with the cloud computing system;
accessing second sensor data acquired by a second sensor that is in communication with the cloud computing system, wherein the second data has a second set of associated attributes including a time at which the second sensor data was acquired, and wherein the second sensor data is associated with the at least one object in the environment;
generating a data processing result based at least in part on the first sensor data, the first set of associated attributes, the second sensor data, and the second set of associated attributes, wherein the data processing result includes a synchronization of the first sensor data and the second sensor data, and wherein the synchronization is based at least in part on (i) an identification of one or more data points from the first sensor data and the second sensor data and (ii) an extrapolation of the identified data points to a common time; and in response to the data processing result being indicative of a threshold high level of certainty of an identification of the at least one object, wherein the data processing result being indicative of the threshold high level of certainty of the identification is based at least in part on the synchronization being conclusive, providing instructions to the one or more robots to perform a task associated with the identified at least one object.

19. The non-transitory computer readable medium of claim 18, wherein the first set of associated attributes further includes a location at which the first sensor data was acquired, wherein the second set of associated attributes further includes a location at which the second sensor data was acquired, wherein the data processing result further includes a localization of the first sensor data and the second sensor data, and wherein the data processing result being indicative of the threshold high level of certainty of the identification of the at least one object is further based on the localization being conclusive.

* * * * *